US012683470B2

(12) United States Patent
Date

(10) Patent No.: US 12,683,470 B2
(45) Date of Patent: Jul. 14, 2026

(54) METHOD TO IMPROVE ADHESION OF ROTOR MAGNETS BEING EMBEDDED IN AN INTERIOR PERMANENT MAGNET MOTOR

(71) Applicant: Ranjit Arun Date, Maharashtra (IN)

(72) Inventor: Ranjit Arun Date, Maharashtra (IN)

( * ) Notice: Subject to any disclaimer, the term of this patent is extended or adjusted under 35 U.S.C. 154(b) by 323 days.

(21) Appl. No.: 18/023,355

(22) PCT Filed: Dec. 4, 2020

(86) PCT No.: PCT/IB2020/061489
§ 371 (c)(1),
(2) Date: Feb. 25, 2023

(87) PCT Pub. No.: WO2022/043744
PCT Pub. Date: Mar. 3, 2022

(65) Prior Publication Data
US 2023/0327529 A1 Oct. 12, 2023

(30) Foreign Application Priority Data
Aug. 27, 2020 (IN) .............................. 202021036938

(51) Int. Cl.
*H02K 15/03* (2025.01)
*B32B 37/12* (2006.01)
*H02K 1/276* (2022.01)
*H02K 1/28* (2006.01)

(52) U.S. Cl.
CPC ............. *H02K 15/03* (2013.01); *H02K 1/276* (2013.01); *H02K 1/28* (2013.01); *B32B 37/12* (2013.01); *B32B 37/1292* (2013.01)

(58) Field of Classification Search
CPC ........ H02K 1/276; H02K 15/03; B32B 37/12; B32B 37/1253; B32B 37/1284; B32B 37/1292
USPC ......................................................... 156/293
See application file for complete search history.

(56) References Cited

U.S. PATENT DOCUMENTS

| | | | |
|---|---|---|---|
| 6,225,724 B1 | 5/2001 | Toide et al. | |
| 2012/0222288 A1 | 9/2012 | Du et al. | |
| 2014/0042856 A1* | 2/2014 | Miyashita | H02K 1/276 |
| | | | 310/156.21 |

FOREIGN PATENT DOCUMENTS

| | | | | | |
|---|---|---|---|---|---|
| JP | 2002272033 A | * | 9/2002 | .......... | H02K 1/2773 |
| JP | 2003199303 A | | 7/2003 | | |

\* cited by examiner

*Primary Examiner* — Carson Gross

(57) ABSTRACT

Disclosed herein is a method for improving the adhesive-based embedding of a permanent magnet (01) within a receiving cavity (02) in a rotor (03) of an interior permanent magnet motor, wherein metered quantities of adhesive are precisely applied at a pair of instances (04A and 4B) and another pair of instances (6A and 06B) to the permanent magnet (01) and its receiving cavity (02) respectively, whereby during the motion of insertion, the adhesive respectively present on the permanent magnet (01) and the receiving cavity (02) experience counter-shear and hence opposing displacement to consequently completely fill up the void space therebetween without overflow to result in said permanent magnet (01) being embedded, with improved adhesion, within in the rotor (03).

10 Claims, 4 Drawing Sheets

METHOD TO IMPROVE ADHESION OF ROTOR MAGNETS BEING EMBEDDED IN AN INTERIOR PERMANENT MAGNET MOTOR

CROSS REFERENCES TO RELATED APPLICATIONS

This international application is filed further to Indian application for patent No. 202021036938 filed on 27 Aug. 2020, the contents of which are incorporated herein in their entirety, by reference.

FIELD OF THE INVENTION

This invention relates generally to the field of adhesive-based joints. More particularly the present invention outlines an inventive method, and the system generated thereby, via an exemplary use-case in which the adhesion of magnets is significantly improved while said magnets are being embedded within the rotor of an interior permanent magnet motor.

DEFINITIONS

Before undertaking the disclosures to follow, it may be advantageous to set forth definitions of certain words or phrases used throughout this document. Also, as some technical terms are not used uniformly in the field of the instant invention, a few definitions are given in the following to clarify the meaning of terms as they are used herein. Accordingly, the term "IPM" refers an interior permanent magnet motor; "SPM" refers surface permanent magnet; "magnet" refers a material or object that produces a magnetic field; "Adhesive" refers a liquid or semi-solid material that binds two or more surfaces together and thereafter resists their separation; and "cavity" refers slots or cores in rotors of IPMs designed to receive magnets.

BACKGROUND OF THE INVENTION AND DESCRIPTION OF RELATED ART

IPMs are preferred over SPMs mainly due to the advantage of reluctance torque and importantly, the inherently-reduced risk of magnets being peeled off due to centrifugal force. This salience is attributed to the fact that said magnets are accommodated by being fixedly embedded in cavities priorly provisioned within the bodies of rotors comprising the IPMs.

It is readily appreciable therefore, that for optimum performance of IPMs, the process of embedding has to be critically perfect and so marked by having no gaps or room for movement of the magnets when embedded, which factors otherwise contribute to misalignment or vibration of the magnets across time and thereby invite suboptimal efficiency or damage to said IFMs.

The process of embedding permanent magnets within rotors of IPMs is conventionally undertaken by applying adhesive on the external surfaces of the magnets. Alternatively, application of adhesive is done on the internal surfaces of rotor cavities which are designed to receive said magnets. Application of adhesive is done prior to insertion of the magnets within their receiving cavities, while the insertion itself brings the aforementioned surfaces, in other words the mating surfaces, in contact with each other to thereby realize an adhesive-based joint.

FIG. 1 illustrates a prior art conventional technique for adhesive-based embedding of a permanent magnet (01)

within a cavity (02) provisioned within an IPM rotor (03). As seen in this FIG. 1, the adhesive is typically applied in form of a pair of beads (04A and 04B) onto the portion of the permanent magnet (01) which is foremost for being received into the rotor cavity (02). Owing to the motion of inserting said permanent magnet (01) into the cavity (02) via manual or automated means such as robotic stamping, the adhesive in the beads (04A and 04B) experiences sliding or shear forces and is thus displaced to spread in a direction generally opposing that of insertion of the permanent magnet (01). Displacement of adhesive in the beads (04A and 04B) occurs also due to cohesive shear between the adhesive stuck to the permanent magnet (01) and the adhesive pool formed due to motion of the permanent magnet (01) inside the cavity (02). This results in an undesired heterogeneous spreading pattern, leaving a thin coat of the adhesive in the beads (04A and 04B) on the rotor (03), but with no continuous and/or homogenous bonding between the mating surfaces, especially gaps (represented by the common numeral 05, running along the lateral sides/periphery of the permanent magnet (01)) between the layer (07) of adhesive on the longitudinal sides/lateral surfaces of said permanent magnet (01) and inner surface of the receiving cavity (02). Furthermore at the completion of insertion, the top portion of the permanent magnet (01) which follows last for being received into the rotor cavity (02) may have no adhesive available to bond with the cavity (02).

FIG. 2 illustrates another conventional technique for adhesive-based embedding of a permanent magnet (01) within a cavity (02) provisioned within an IPM rotor (03). As seen in this FIG. 2, the application of adhesive is done on the internal surfaces of rotor cavity (02) which is designed to receive said permanent magnet (01). Here, the adhesive is typically applied in form of a pair of beads (06A and 06B) onto the inside surface of the cavity (02) which is foremost to the permanent magnet (01) when said magnet (01) is being received into the rotor cavity (02). Owing to the motion of inserting said permanent magnet (01) into the cavity (02) via manual or automated means such as robotic stamping, the adhesive in the beads (06A and 06B) experience sliding or shear forces and the adhesive is thus displaced to spread in a direction generally same as that of insertion of the permanent magnet (01). Thus effectively, the adhesive is dragged along with the magnet (01) as it travels deeper into its receiving cavity (02). This too, as mentioned in the preceding paragraph, results in an undesired heterogeneous spreading pattern with no continuous and/or homogenous bonding between the mating surfaces of the permanent magnet (01) and its receiving cavity (02). Furthermore at the completion of insertion, the adhesive is dragged to bottom of the cavity (02), therein leaving the lateral sides of the permanent magnet (01) to have no adhesive available to bond with the walls of the cavity (02).

Besides achieving less-than desired adhesive-bonding, the conventional methods wherein adhesive is applied either to the magnets or to their receiving cavities are unequivocally dependent on that the adhesive used has low viscosity, and hence said methods are not useful in applications wherein medium to high viscosity adhesives are to be used.

Also, depending upon viscosity, curing properties of the adhesive used, and forces acting on the adhesive such as gravity and those due to pressures exerted on the adhesive, gaps or cavities may be created in the adhesive layer between the mating surfaces, which results in a significant loss of bonding strength, and joint failures, either of which are deleterious for performance of the IPMs.

It is therefore an acute need of the art therefore, to have some means to avoid such occurrences and thereby improve on bonding of magnets inside IPM rotor core cavities. This need is also generalized wherever adhesive-based joints are required between surfaces of parts which, as part of their bonding process, need to move in directions which cause sliding or shear forces on adhesive.

While there were many common art references researched by the inventor(s) in ensuring that the present invention is novel, the following patent prior art was identified as related to the present invention, and thus worthwhile to discuss in more detail in context of the present invention. One example is Innovative methods for automated assembly and fixation of permanent magnets in electrical machines (J Franke, B Hofmann, J Tremel, A Meyer—Procedia CIRP, 2015—Elsevier https://cyberleninka.org/article/n/393567, last accessed on the filing date of this application) which teaches an approach for adhesive-based fixation of magnets in which heating or cooling (–40° C. to 125° C.) is proposed as a process modification in order to accommodate alternative adhesives. Another example is Effects of various parameters on dynamic characteristics in adhesively bonded joints (A Kaya, M S Tekelioğlu, F Findik—Materials Letters, 2004—Elsevier https://www.sciencedirect.com/science/article/abs/pii/S0167577X04004549 last accessed on the filing date of this application) which mentions use of in-plane vibration for augmenting single-lap joints. However, these approaches are riddled with complexities and are nonetheless non-specific to instant use case of the present invention, being adhesive-based affixation/embedding of magnets to rotor discs of IPMs.

Another notable prior art approach (reference: DELO DUOPDX https://cyberleninka.org/article/n/393567 last accessed on the filing date of this application) includes that the adhesive used is selected as one having very low viscosity and may be applied on the magnet as a dot or a thick line prior to insertion of the magnet inside the rotor core, such that the shear can be used for spreading the adhesive, but the viscosity is low enough to not cause a lot of adhesive displacement and the gaps between the magnet and the inner surfaces of the receiving cavity can be filled by fluidity of the adhesive itself. However, this approach severely limits the choice of adhesives, as well as the effectiveness of bonding area coverage, hence inapplicable to the instant use-case.

Another notable prior art approach (reference: Methods for Automated Assembly and Fixation of Permanent Magnets in Electrical Machines) includes using low viscosity adhesive puddle in the slot, and plunging the magnet to extrude the adhesive to fill the gaps. However, this approach is limited in that very low viscosity adhesive is required, as well as wastage of adhesive and potential quality issues are seen to arise from excess adhesive from the spillages from excess cavities on sides of magnets (flux gaps) normally provided on sides of the magnets.

Without exception therefore, the prior art referenced till date, and thus to best knowledge of the applicant herein, does not disclose how to improve adhesive-based joints between parts having unfavorable motion with respect to one another. Hence, the aforementioned need in the field of adhesive-based joints yet survives and hence need for this invention. Work of the applicant named herein, specifically directed against the technical problems recited hereinabove and currently part of the public domain including earlier filed patent applications, is neither expressly nor impliedly admitted as prior art against the present disclosures.

A better understanding of the objects, advantages, features, properties and relationships of the present invention will be obtained from the following detailed description which sets forth an illustrative yet-preferred embodiment.

OBJECTIVES OF THE PRESENT INVENTION

The present invention is identified in addressing at least all major deficiencies of art discussed in the foregoing section by effectively addressing the objectives stated under, of which:

It is a primary objective to provide a method that enables improved adhesive-based bonding between articles which move laterally while being received in respect to one another.

It is another objective further to the aforesaid objective(s) that said method provisions for maximum bonding area and hence optimum strength of the adhesive joint.

It is another objective further to the aforesaid objective(s) that said method negates the need for continuous application of adhesive to achieve maximum bonding area and hence optimum strength of the adhesive joint.

It is another objective further to the aforesaid objective(s) that said method ensures the adhesive completely fills in and leaves no gaps between surfaces of the articles being received in respect to one another.

It is another objective further to the aforesaid objective(s) that said method ensures no room for movement, post-adhesion, of the articles being received in respect to one another.

It is another objective further to the aforesaid objective(s) that said method is capable of being implemented irrespective of the dimensions and geometries of the articles being received in respect to one another.

It is another objective further to the aforesaid objective(s) that said method introduces minimal variation in process or tooling involved in conventional processes for adhesive-based bonding of permanent magnets into rotors of IPMs.

It is another objective further to the aforesaid objective(s) that said method is not riddled with technical complexities and/or undue costs.

The manner in which the above objectives are achieved, together with other objects and advantages which will become subsequently apparent, reside in the detailed description set forth below in reference to the accompanying drawings and furthermore specifically outlined in the independent claim 1. Other advantageous embodiments of the invention are specified in the dependent claims.

BRIEF DESCRIPTION OF DRAWINGS

The present invention is explained herein under with reference to the following drawings, in which.

The above drawings are illustrative of particular examples of the present invention but are not intended to limit the scope thereof. The drawings are not to scale (unless so stated) and are intended for use solely in conjunction with their explanations in the following detailed description. In above drawings, wherever possible, the same references and symbols have been used throughout to refer to the same or similar parts. Though numbering has been introduced to demarcate reference to specific components in relation to such references being made in different sections of this specification, all components are not shown or numbered in each drawing to avoid obscuring the invention proposed.

STATEMENT OF THE PRESENT INVENTION

The present invention is marked in being an inventive proposal for adhesive-based bonding of permanent magnets into rotors of IPMs, in which adhesive is strategically applied near about their respective nearest receiving surfaces, to thereby cause counter-shear between, and hence opposing displacement of, said adhesive fractions, to thereby cause uniform spreading of said adhesive and also leaving no gaps between the adhesive layer on the magnet and inner surface of the cavity in which said magnet is received. The improvement in adhesion is marked by uniform dispersal/spreading of the adhesive and thus increase in area of bonding between the magnets and their receiving cavities in IPM rotors.

Attention of the reader is now requested to the detailed description to follow which narrates a preferred embodiment of the present invention and such other ways in which principles of the invention may be employed without parting from the essence of the invention claimed herein.

DETAILED DESCRIPTION

The present invention is directed at absorbing all advantages of prior art while overcoming, and not imbibing, any of its shortfalls, to thereby establish a mechanism for adhesive-based bonding of two or more articles which allows lateral motions of said articles while being received in respect to one another, without causing or at least minimizing the effect of non uniform adhesive displacement therein.

Figure 1:
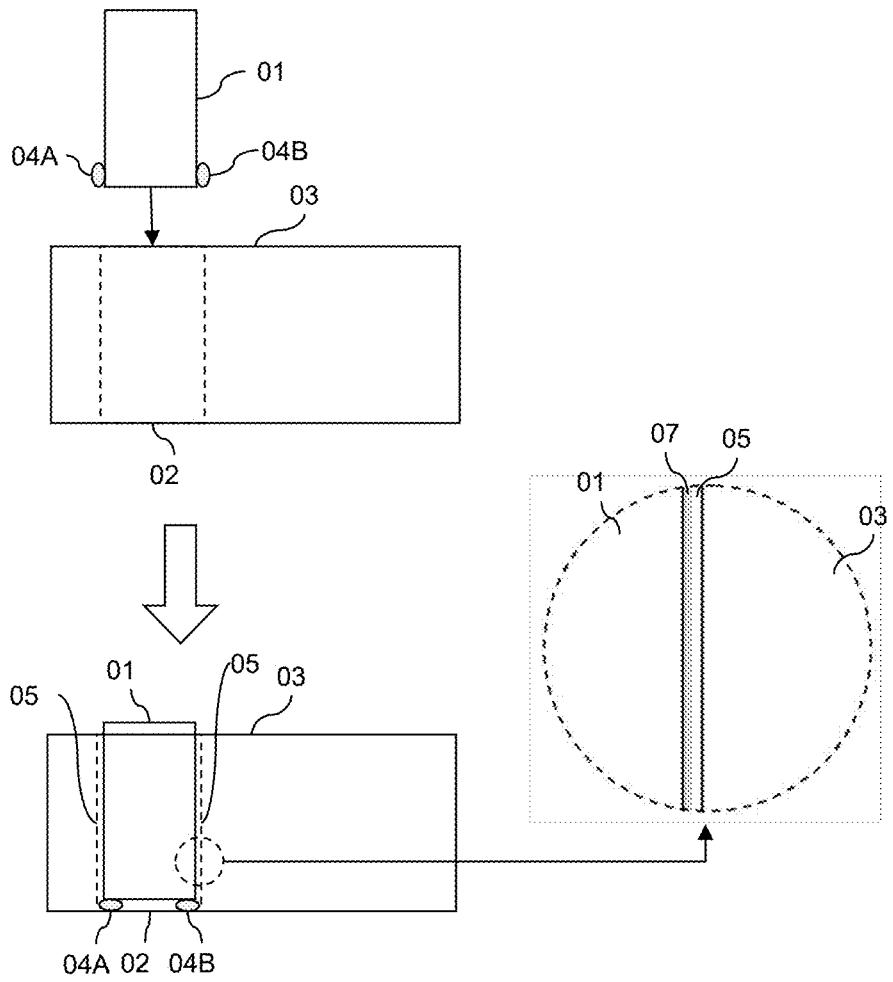
FIG. 1 is a schematic illustration of a prior art conventional technique for adhesive-based embedding of magnets within an IPM rotor.
Figure 2:
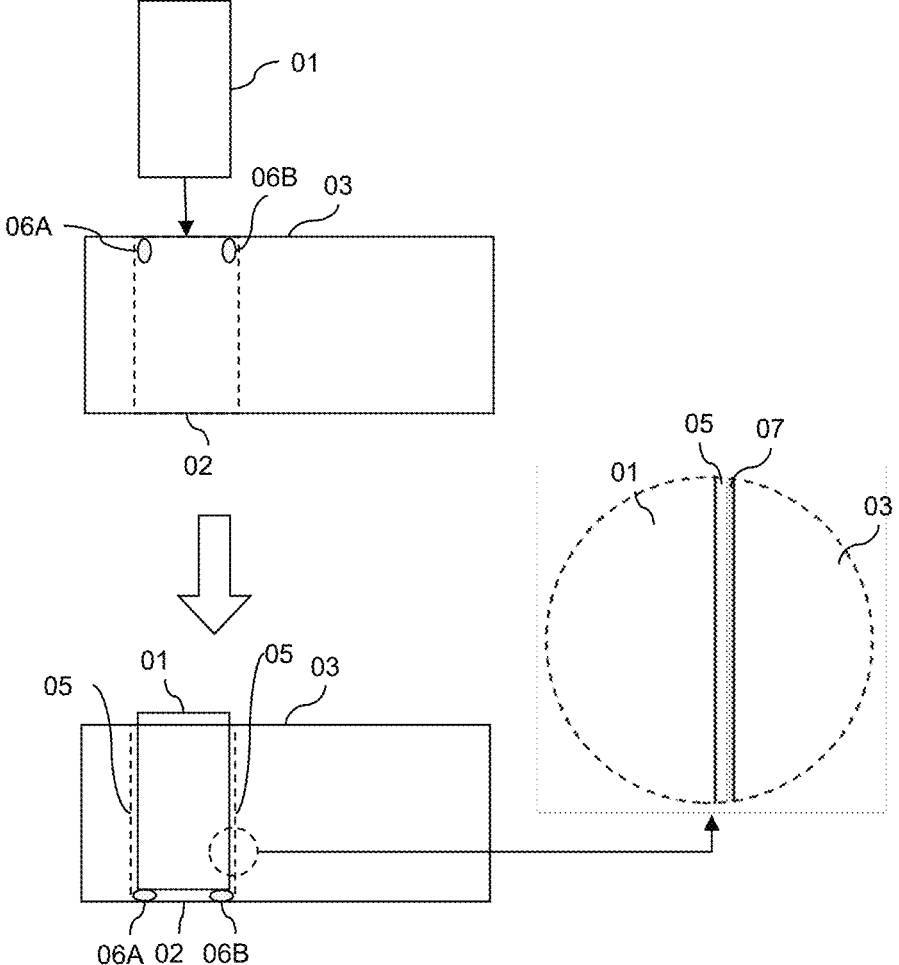
FIG. 2 is a schematic illustration of another prior art conventional technique for adhesive-based embedding of magnets within an IPM rotor.
Figure 3:
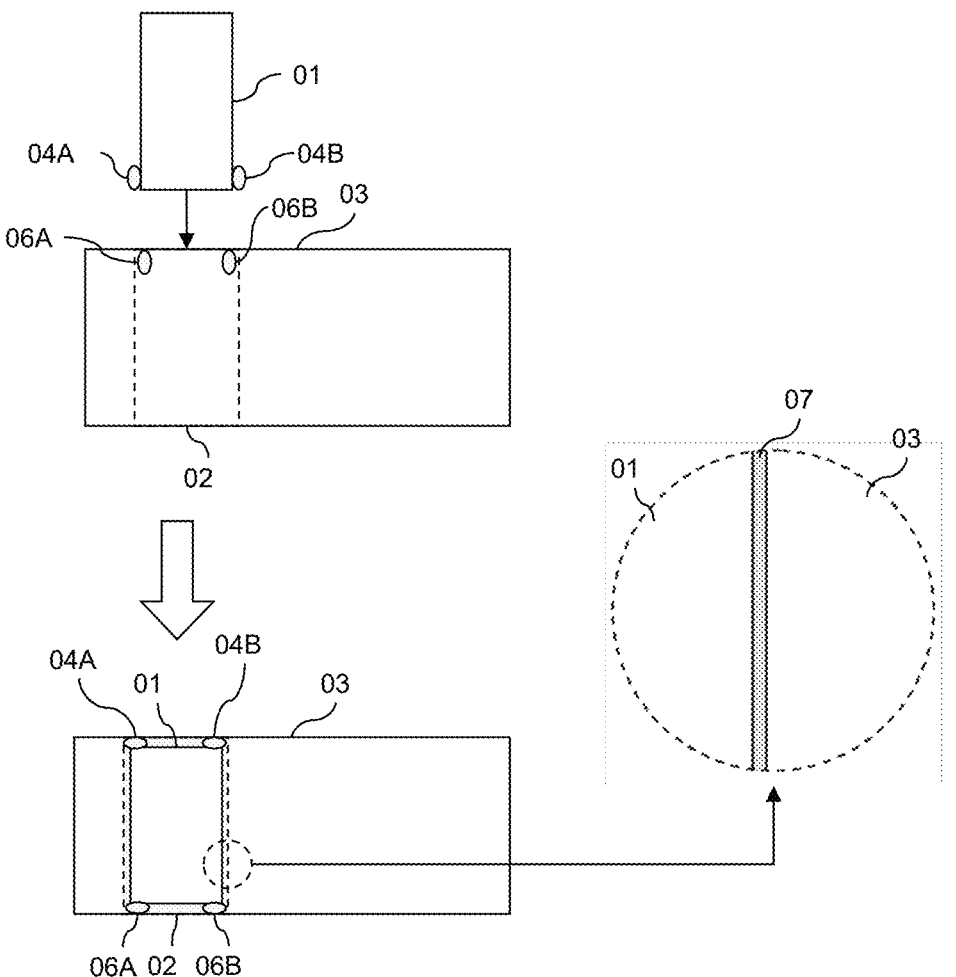
FIG. 3 is a schematic illustration of the method for improved adhesive-based embedding of magnets within an IPM rotor in accordance with the present invention.

FIG. 3 illustrates the preferred mode of implementing the method for adhesive-based embedding of a permanent magnet (01) within an IPM rotor (03) in accordance with the present invention. Here, a viscous liquid adhesive is applied in form of two pairs of beads among which one pair of beads (04A and 04B) is applied at the bottom of the permanent magnet (01) and the other pair of beads (06A and 06B) is applied at the top of the cavity (02) present within the IPM motor core (03).

According to one aspect of the present invention, the pair of beads (04A and 04B) is applied at a site, and to a substantial portion therein on the external surface, or in other words on the peripheral/lateral surface, at a portion/end of the permanent magnet (01) which is received first into the cavity (02) while being inserted into said cavity (02).

According to another aspect of the present invention, the pair of beads (06A and 06B) is applied at a site, and to a substantial portion therein onto the internal surface, or in other words on the inner perimeter/surface of the wall defining the cavity (02), at a portion/end of said cavity (02) which first receives the permanent magnet (01) while said permanent magnet (01) is being received into the cavity (02).

Preferably where the magnets and their receiving cavities are substantially rectangular or polygonal, opposing faces of the magnet and/or the cavity are selected for application of adhesive, so that each pair of mating surfaces is effectively bonded via said adhesive, so as to secure maximum bonding area. In further embodiments hereof, selection of adjacent faces of either among the magnet and/or cavity is intended to be covered depending on application on hand.

It shall be understood that the application of adhesive may be undertaken in different formats, such as bead or ring configuration or any part of the same, and any combinations thereof without affecting essence of the present invention.

It shall be further understood that volume of adhesive to be applied is one adequate for realizing maximal bonding area between mating surfaces of the magnet and corresponding cavity, and filling the gap there between. This can be theoretically computed with ease once dimensions and geometry of the magnet and cavity are known.

The aforementioned relative positioning of the first pair of beads (04A and 04B) at the bottom of the permanent magnet (01) and the second pair of beads (06A and 06B) at the top of the core slot (02) ensures counter-shear of said adhesive beads, that is pair (04A and 04B) relative to the pair of beads (06A and 06B) while said permanent magnet (01) is being inserted/received into the cavity (02). As the adhesive shears with the permanent magnet (01) being inserted into the cavity (02), it leaves a thin coat on rotor (03) and also bonds with the cavity (02) in the rotor (03).

The aforementioned counter-shear results in opposing displacement of said adhesive contained in said beads, that is pair (04A and 04B) vis-à-vis the pair of beads (06A and 06B) with respect to one another, along with the vector of insertion of the permanent magnet (01) into the cavity (02). In simple words, the permanent magnet (01) thus drags the adhesive applied on the top of the cavity (02), and the cavity (02) drags the adhesive applied on the permanent magnet (01) thereby filling the void left by the motion of insertion of the permanent magnet (01) into the cavity (02). This also implies no room for movement, post-adhesion, of the permanent magnet (01) within/out of the cavity (02) while the rotor (03) is in motion.

Consequentially as shown in the accompanying FIG. 3, no gap is left between the layer (07) of adhesive on the longitudinal sides/lateral surfaces of the permanent magnet (01) and inner surface of the receiving cavity (02) when the permanent magnet (01) is fully inserted/received into the cavity (02) therein ensuring optimal surface coverage and therefore optimal strength of bonding. This also ensures that entire surface area of the magnet is uniformly bonded (maximum bonding area) with the receiving surfaces of the cavity with help of adhesive layer, hence optimum strength of the adhesive joint without mandating continuous application of adhesive for said purpose.

From an industrial implementation perspective for the present invention, adhesive beads are applied accurately in a uniform and precise regulated quantity (depending on bonding surface to be covered which is a function of dimensions and geometry of the permanent magnet and cavity) on the magnet and rotor cavity by means of a robot through a positive displacement pump implemented from off-the shelf common art solutions. In the method proposed herein, it shall be appreciated that the amount of adhesive is provisioned in calibrated amount sufficient to adequately cover maximum bonding area available/desired between the magnet and the cavity, and no more. Hence, there is no wastage of adhesive and also there is no need for continuous application of adhesive for achieving the joint.

Magnet insertion on the other hand, is preferably done using controlled motion pick and place device implemented from off-the shelf common art solutions. This function can however be undertaken manually in the alternative.

EXPERIMENTAL VALIDATION

Working and efficacy of the present invention have been experimentally validated by the applicant named herein as a function of the force required for de-bonding magnets which were priorly arranged by the method of this invention outlined above, to adhere within receiving cavities in IPM rotors. The experimental protocol, observations, and inferences are outlined in the paragraphs to follow.

Materials: Magnets admeasuring an average of 14.18 mm width×3.95 mm thickness×21.25 mm height were selected for insertion into cavities admeasuring an average of 14.385 mm width×4.1 mm thickness×21.55 mm height machined within the body of an IPM rotor. Force measurements were undertaken using a Bonded Strain Gauge "Pan Cake" Type load cell (Syscon make, 4100 Series, having capacity of 2 tons, resolution of 1 Part in 2000 (01 kg), and operating temperature of +10° C. to 45° C.). Adhesive bond (TB1530, make-ThreeBond, a typical high viscosity adhesive, with viscosity of 1000 P) was used for purpose of this trial. Design of rotor (03) and permanent magnet (01) to be received in cavity (02) of the rotor (03) are shown in the accompanying FIG. 3.

Trial protocol: For comparative/differential analysis, adhesive-based embedding of permanent magnets inside IPM rotor core cavities was performed by following methods— a) Conventional method (Reference run A)—Here, beads of adhesive were applied only to the magnets at their portions which come foremost to the mouths of their receiving cavities/first entering the cavities during the embedding process.

b) Another conventional method (Reference run B)—Here, beads of adhesive were applied only to the cavities at their portions which come foremost to the magnets being received there-within during the embedding process.

c) The inventive method of the present invention (test run)—here, beads of adhesive were applied to both the magnets and the cavities in which said magnets were received.

In all of the methods a) to c) above, the permanent magnets were inserted into their receiving cavities using a robotic pick and place tool.

For the conventional methods, that is the reference runs A and B, two beads of adhesive were applied with the help of a positive displacement pump and robot on the magnets (in reference run A) in a manner identified in having one bead at each face of said magnets near their bottom portions. Alternatively, the beads of adhesive were applied to cavities (in reference run B) in a manner identified in having one bead on surface of the walls of said cavities, respectively.

For the method of this invention, that is the test run, two beads of adhesive were applied with the help of a positive displacement pump and robot on opposing faces of the magnets at their bottom tips, that is, one bead at each face of said magnets. Two beads of adhesive were additionally applied with the help of a positive displacement pump and robot in each cavity, that is, one bead at top of each opposing face near the open mouth of said cavity.

It shall be appreciated that the present invention is not restricted to selection of faces for application of adhesive, which is mentioned herein with an assumption that the magnet has a non-circular cross-section. Adhesive may be applied on adjacent faces as well, or furthermore to opposing/adjacent points on the magnets and their receiving cavities in case they have circular cross-sections.

The magnets to be embedded within the cavities were picked up by a pick place tool which flipped 180 degrees for dispensing of the magnet. Upon dispensing of magnets within their receiving cavities, the adhesive was allowed to cure for 24 hours at room temperature (approximately 22° C. to 25° C.). Force required for de-bonding the adhered magnets was measured using the load cell specified above, for concluding the comparative/differential analysis undertaken.

Centrifugal force acting on magnet was calculated theoretically and hence, shear bonding was assumed to be the minimum required to retain the position of the magnet in place. This served as the reference/standard run for the trial conducted.

Observations: The above protocol was reiterated for meaningful statistical determinations, and the observations are as provided in Table 1 below—

TABLE 1

| Method of bonding | Average Value of Debonding Force(Kg) |
|---|---|
| a) Theoretical | 88.1 |
| b) Conventional/Prior art (Reference run A) | 46.3 |
| c) Conventional/Prior art (Reference run B) | 25.5 |
| d) Present invention (Test run) | 139.5 |

Results: The sheer increase in de-bonding force as determined above indicated significantly improved adhesive-based bonding between the magnet and the rotor cavity, thereby marking high efficacy of the present invention.

From the results mentioned above, it shall be appreciated that the increase in de-bonding force observed for the test run is far more than a mere additive effect for the reference runs A and B. This is unexpected and significant over the combinations of reference runs A and B, therein allowing the present invention to score well over teachings of prior art.

INDUSTRIAL UTILITY

From the foregoing narration, an able methodology for achieving improved adhesive-based bonding of two or more articles (permanent magnet and rotor in the present case) which allows lateral motions of said articles while being received in respect to one another is thus provided which is unprecedented till date as to the present use-case of mass production of rotors, and any other product requiring insertion of magnets in close gap cavities/slots requiring adhesive bonding.

As shall be readily appreciated by the reader, types of adhesive, size of adhesive beads applied are among important control parameters for ensuring that no gap is left between adhesive layer and magnet. Selection and/or optimization of these, according to size and geometries of the magnets/cavities chosen, follows various embodiments of the present invention which are all intended by the applicant without departing from the essence disclosed herein.

Figure 4:
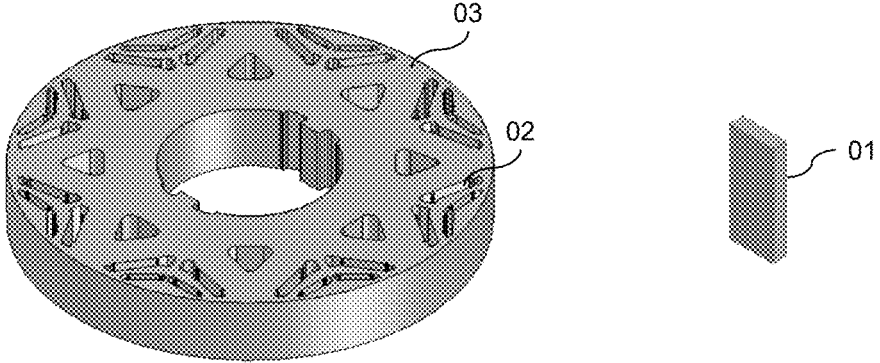
FIG. 4 illustrates the design of rotor (03) and permanent magnet (01) to be received in cavity (02) of the rotor (03) in accordance with the present invention.

FIG. 4 illustrates the design of rotor (03) and permanent magnet (01) to be received in cavity (02) of the rotor (03) in accordance with the present invention. The reader shall appreciate that though the aforesaid description has been illustrated schematically in FIG. 3, application of the present invention is intended for complex geometries shown, by way of example, in the FIG. 4.

As shall be further appreciated by the reader, the present invention is innately typified in having the following virtues—

1) Entire magnet surface area is uniformly bonded (maximum bonding area) with the receiving surfaces of the cavity with help of adhesive layer, hence optimum strength of the adhesive joint without mandating continuous application of adhesive for said purpose;

2) all gaps between the rotor cavity and magnet are effectively filled in by the adhesive layer, in a manner that adhesive spreads adequately yet does not have too much overflow;

3) minimal adhesive is required while ensuring that their embedding within the rotor core cavities is critically perfect and so marked by having no gaps or room for movement of the magnets when embedded;

4) the method proposes is applicable without major deviations to all possible dimensions and geometries of cavities and magnets;

5) no chance for debris of adhesive to enter the IPM rotor core, thereby negating the requirement of post cleanup, or future performance risk to the IPMs; and 6) augmentative techniques such as variations on the insertion motion like vibrations or oscillations are also possible to be integrated in the methodology of the present invention to improve the adhesion between the magnet and receiving cavity.

As will be realized further, the present invention is capable of various other embodiments and that its several components and related details are capable of various alterations, all without departing from the basic concept of the present invention. And accordingly, the foregoing description will be regarded as illustrative in nature and not as restrictive in any form whatsoever.

Modifications and variations of the system and apparatus described herein will be obvious to those skilled in the art. Such modifications and variations are intended to come within ambit of the present invention, which is limited only by the appended claims.

I claim:

1. A method to improve adhesion of a permanent magnet (01) while being embedded within a cavity (02) in a rotor (03) of an interior permanent magnet motor, the method comprising— a) Applying a metered quantity of a viscous adhesive on an outer surface of the permanent magnet (01) which is foremost for insertion into the cavity (02);

b) Applying a metered quantity of the viscous adhesive on an inner surface of the cavity (02) which is foremost for receiving the permanent magnet (01); and c) Inserting the permanent magnet (01) into the rotor cavity (02), to cause counter-shear and hence opposing displacement of the viscous adhesive applied respectively on the permanent magnet (01) and the cavity (02) to result in improved embedding of the permanent magnet (01) within the cavity (02), said improvement being characterised in that— the viscous adhesive is applied on mating surfaces of the permanent magnet (01) and the cavity (02) in either a bead or a ring configuration, any part of the same, or any combinations thereof in at least one pair of instances (04A and 04B) along an outer perimeter of the permanent magnet (01) near an end of the permanent magnet (01) that is first inserted into the cavity (02) and in at least another pair of instances (06A and 06B) on a mating inner perimeter surface of the cavity (02) near an opening of the cavity (02) that first receives the permanent magnet (01) when the permanent magnet (01) is inserted into the cavity (02);

the viscous adhesive applied respectively on the permanent magnet (01) and the cavity (02) is uniformly spread and completely fills up a void space therebetween without any overflow through the counter-shear and opposing displacement of the viscous adhesive when the permanent magnet (01) is inserted into the rotor cavity (02); and strength of adhesive-based bonding achieved corresponds to a debonding force of 139.5 kg.

2. The method to improve adhesion of a permanent magnet (01) while being embedded within a cavity (02) in a rotor (03) of an interior permanent magnet motor as claimed in claim 1, wherein the application of the viscous adhesive is undertaken via four specific instances in a bead configuration.

3. The method to improve adhesion of a permanent magnet (01) while being embedded within a cavity (02) in a rotor (03) of an interior permanent magnet motor as claimed in claim 1, wherein the metered quantities of adhesive for application on to the permanent magnet (01) and the cavity (02) are applied in predetermined amounts sufficient to completely fill the void space between lateral surfaces of the permanent magnet (01) and the inner surface of the receiving cavity (02) without any overflow when the permanent magnet (01) assumes a completely embedded position within its receiving cavity (02) in the rotor (03) of the interior permanent magnet motor.

4. The method to improve adhesion of a permanent magnet (01) while being embedded within a cavity (02) in a rotor (03) of an interior permanent magnet motor as claimed in claim 3, wherein the metered quantities of adhesive at the instances (04A and 04B) along the outer perimeter of the permanent magnet (01) are applied correspondingly on any pair of opposing or adjacent faces of said permanent magnet (01).

5. The method to improve adhesion of a permanent magnet (01) while being embedded within a cavity (02) in a rotor (03) of an interior permanent magnet motor as claimed in claim 3, wherein the metered quantities of adhesive at the instances (06A and 06B) on the inner perimeter of the cavity (02) are applied correspondingly on any pair of opposing or adjacent surfaces along the walls of said cavity (02).

6. The method to improve adhesion of a permanent magnet (01) while being embedded within a cavity (02) in a rotor (03) of an interior permanent magnet motor as claimed claim 1, wherein the viscous adhesive has a viscosity of 1000 P.

7. The method to improve adhesion of a permanent magnet (01) while being embedded within a cavity (02) in a rotor (03) of an interior permanent magnet motor as claimed in claim 1, wherein insertion of the viscous adhesive-bearing permanent magnet (01) into the adhesive-bearing rotor cavity (02) is undertaken manually.

8. The method to improve adhesion of a permanent magnet (01) while being embedded within a cavity (02) in a rotor (03) of an interior permanent magnet motor as claimed in claim 1, wherein insertion of the adhesive-bearing permanent magnet (01) into the adhesive-bearing rotor cavity (02) is undertaken in an automated manner using a pick and place device.

9. The method to improve adhesion of a permanent magnet (01) while being embedded within a cavity (02) in a rotor (03) of an interior permanent magnet motor as claimed in claim 3, wherein the metered quantity of adhesive applied on the outer surface of the permanent magnet (01) is applied correspondingly on any pair of opposing or adjacent faces of said permanent magnet (01).

10. The method to improve adhesion of a permanent magnet (01) while being embedded within a cavity (02) in a rotor (03) of an interior permanent magnet motor as claimed in claim 3, wherein the metered quantity of adhesive applied on to the inner surface of the cavity (02) is applied correspondingly on any pair of opposing or adjacent surfaces along the walls of said cavity (02).

\*  \*  \*  \*  \*